US012663880B2

(12) United States Patent
Chin et al.

(10) Patent No.: US 12,663,880 B2
(45) Date of Patent: Jun. 23, 2026

(54) VIRTUAL REALITY CONTROL DEVICE AND VIRTUAL REALITY SYSTEM

(71) Applicant: Razer (ASIA-PACIFIC) PTE LTD., Singapore (SG)

(72) Inventors: Wooi Liang Chin, Singapore (SG); Kah Yong Lee, Singapore (SG); Gil Jr Palma Guerrero, Singapore (SG); Pengfei Gao, Singapore (SG)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

(21) Appl. No.: 18/879,859

(22) PCT Filed: Aug. 11, 2023

(86) PCT No.: PCT/SG2023/050553
§ 371 (c)(1),
(2) Date: Dec. 30, 2024

(87) PCT Pub. No.: WO2024/035347
PCT Pub. Date: Feb. 15, 2024

(65) Prior Publication Data
US 2025/0377738 A1 Dec. 11, 2025

Related U.S. Application Data

(60) Provisional application No. 63/397,738, filed on Aug. 12, 2022.

(51) Int. Cl.
G06F 3/0346 (2013.01)
G06F 3/0354 (2013.01)
(Continued)

(52) U.S. Cl.
CPC ........ *G06F 3/0346* (2013.01); *G06F 3/03549* (2013.01); *G06F 3/0362* (2013.01); *G06F 3/04815* (2013.01); *G06F 3/0338* (2013.01)

(58) Field of Classification Search
CPC .. G06F 3/0346; G06F 3/03549; G06F 3/0362; G06F 3/04815; G06F 3/0338
See application file for complete search history.

(56) References Cited

U.S. PATENT DOCUMENTS 5,561,445 A 10/1996 Miwa et al.
11,137,601 B2 10/2021 Wieczorek
(Continued)

FOREIGN PATENT DOCUMENTS

CN 204408543 U 6/2015
CN 108717330 A 10/2018
(Continued)

OTHER PUBLICATIONS

International Search Report; dated Jan. 7, 2024; Application # PCT/SG23/50553.
(Continued)

*Primary Examiner* — Jonathan A Boyd
(74) *Attorney, Agent, or Firm* — Polsinelli PC

(57) ABSTRACT

Aspects concern a virtual reality control device comprising one or more sensors configured to sense sensor data allowing determining the 3D position of the virtual reality control device in 3D space, at least one rotary wheel switch; and an output interface configured to output the sensor data from the one or more sensors and information about a rotation of the at least one rotary wheel switch.

15 Claims, 4 Drawing Sheets

(51) Int. Cl.
| | |
|---|---|
| *G06F 3/0362* | (2013.01) |
| *G06F 3/04815* | (2022.01) |
| *G06F 3/0338* | (2013.01) |

(56) References Cited

U.S. PATENT DOCUMENTS

| | | | | |
|---|---|---|---|---|
| 11,217,021 | B2 | 1/2022 | Motta et al. | |
| 2002/0075233 | A1 | 6/2002 | White et al. | |
| 2004/0189595 | A1* | 9/2004 | Yuasa | G05G 1/08 |
| | | | | 345/156 |
| 2006/0290671 | A1* | 12/2006 | Bohn | G06F 3/0362 |
| | | | | 345/163 |
| 2007/0279380 | A1* | 12/2007 | Murillo | G06F 3/03549 |
| | | | | 345/161 |
| 2008/0174550 | A1* | 7/2008 | Laurila | A63F 13/285 |
| | | | | 345/158 |
| 2010/0105475 | A1 | 4/2010 | Mikhailov et al. | |
| 2011/0134039 | A1* | 6/2011 | Ludwig | G06F 3/038 |
| | | | | 345/163 |
| 2017/0177097 | A1* | 6/2017 | Ding | B60K 35/10 |
| 2017/0308165 | A1 | 10/2017 | Erivantcev et al. | |
| 2019/0149873 | A1 | 5/2019 | Diverdi et al. | |
| 2020/0098185 | A1* | 3/2020 | Schradin | G06T 17/05 |
| 2021/0265037 | A1 | 8/2021 | Lee | |
| 2021/0349529 | A1 | 11/2021 | Winold et al. | |

FOREIGN PATENT DOCUMENTS

| | | | |
|---|---|---|---|
| CN | 113426124 | A | 9/2021 |
| DE | 10 2015 000523 | A1 | 7/2016 |
| EP | 1364276 | A2 | 11/2003 |
| EP | 1 110 172 | B1 | 12/2003 |
| EP | 3059663 | B1 | 9/2018 |
| EP | 2725457 | B1 | 7/2019 |
| EP | 3631606 | A1 | 4/2020 |
| FR | 2 852 116 | B1 | 5/2005 |
| JP | 6470859 | B1 | 2/2019 |
| JP | 2019072346 | A | 5/2019 |
| JP | 2019181074 | A | 10/2019 |
| KR | 20210081779 | A | 5/2023 |
| WO | 2016164697 | A1 | 10/2016 |
| WO | 2017090298 | A1 | 6/2017 |
| WO | 2021252343 | A1 | 12/2021 |

OTHER PUBLICATIONS

First person movement control with palm normal and hand gesture interaction in virtual reality; Chaowanan Khundam (https://www.researchgate.netpublication/313861642_First_person_movement_control_with_palm_normal_and_hand_gesture_interaction_in_virtual_reality).

Extended European Search Report in corresponding European Patent Application No. 23853156.0 mailed Oct. 7, 2025, 8 pages.

\* cited by examiner

VIRTUAL REALITY CONTROL DEVICE AND VIRTUAL REALITY SYSTEM

TECHNICAL FIELD

Various aspects of this disclosure relate to virtual reality control devices and virtual reality systems.

BACKGROUND

A virtual reality system typically outputs video information according to a point of view of an avatar of its user. Usually, the user moves in real life, the user's body movements are tracked, an avatar point of view is adapted accordingly and video data is displayed to the user in accordance with the avatar's point of view. However, there may be scenarios where the user cannot or does not want to move freely in space and wants or needs, for example, to stay seated in a chair. For such cases, the real life body movements need to be (at least partially) simulated in the sense that the user does not (completely) do the desired movement of the avatar to move the avatar (or at least change the avatar's point of view) but can for example stay seated in a chair.

Accordingly, approaches are desirable that let a user conveniently control avatar movement in a virtual reality application.

SUMMARY

Various embodiments concern a virtual reality control device including one or more sensors (e.g. an IMU) configured to sense sensor data allowing determining a 3D position of the virtual reality control device in 3D space, at least one rotary wheel switch; and an output interface configured to output the sensor data from the one or more sensors and information about a rotation of the at least one rotary wheel switch.

Various embodiments are given in the following.

Embodiment 1 is the virtual reality control device as described above.

Embodiment 2 is the virtual reality control device of embodiment 1, comprising one or more tracking elements which allow determining the handheld controller's pose in 3D space by an external device.

Embodiment 3 is the virtual reality control device of embodiment 1 or 2, comprising an analogue stick wherein the at least one rotary wheel switch is in a form of a ring surrounding a base of the analogue stick.

Embodiment 4 is the virtual reality control device of any one of embodiments 1 to 3, comprising multiple rotary wheel switches, wherein the output interface is configured to output information about a rotation of each of the multiple rotary wheel switches.

Embodiment 5 is the virtual reality control device of any one of embodiments 1 to 4, wherein the multiple rotary wheel switches include two or more rotary wheel switches in a form of rings stacked on top of each other.

Embodiment 6 is the virtual reality control device of embodiment 5, wherein the multiple rotary wheel switches include two or more rotary wheel switches whose rotation axes are inclined with respect to each other.

Embodiment 7 is the virtual reality control device of embodiment 5 or 6, wherein the multiple rotary wheel switches include two or more rotary wheel switches whose rotation axes are at least substantially perpendicular to each other.

Embodiment 8 is the virtual reality control device of any one of embodiments 1 to 7, wherein at least one rotary wheel switch is configured to return to a default position when released.

Embodiment 9 is the virtual reality control device of any one of embodiments 1 to 9, further comprising a track ball wherein the output interface is configured to output information about a rotation of the at least one track ball.

Embodiment 10 is the virtual reality control device of any one of embodiments 1 to 8, wherein the output interface is a wireless output interface.

Embodiment 11 is the virtual reality control device of any one of embodiments 1 to 10, wherein the output interface is configured to connect to a virtual reality data generation system and output the sensor data from the one or more sensors and the information about the rotation of the at least one rotary wheel switch to the virtual reality data generation system.

Embodiment 12 is a virtual reality system comprising the virtual reality control device of any one of embodiments 1 to 11 and a virtual reality data generation system having an input interface configured to receive the sensor data from the one or more sensors and the information about the rotation of the at least one rotary wheel switch and one or more processors configured to render an image depending on the sensor data and information about a rotation of the rotary wheel switch.

Embodiment 13 is the virtual reality system of embodiment 12, wherein the image is a view from a point of view of a user avatar and the one or more processors are configured to determine a rotation of at least a part of the avatar and the point of view according to the information about the rotation of the rotary wheel switch.

Embodiment 14 is the virtual reality system of embodiment 12 or 13, wherein the virtual reality control device comprises multiple rotary wheel switches and wherein the output interface is configured to output information about a rotation of each of the multiple rotary wheel switches and wherein the virtual reality data generation system is configured to determine, for each of the rotary wheel switches, a rotation of a respective body part associated with the rotary wheel switch according to information about a rotation of the rotary wheel switch and to render the image in accordance with the determined rotations of the body parts.

Embodiment 15 is the virtual reality system of embodiment 14, wherein the body parts include two or more of legs of the avatar, a torso of the avatar and a head of the avatar.

Embodiment 16 is a virtual reality system comprising a chair, a tracking device configured track a rotation of the chair and a virtual reality data generation system having one or more processors configured to render an image depending information about a rotation of the chair.

Embodiment 17 is the virtual reality system of embodiment 16, comprising a screen fixed to the chair configured to display the rendered image.

Embodiment 18 is the virtual reality system of embodiment 16 or 17, wherein the chair comprises a tracking element and the tracking device is configured to track the rotation of the chair by means of optical tracking of the tracking element.

Embodiment 19 is the virtual reality system of embodiment 16 or 17, wherein the chair comprises a rotation sensor connected to the tracking device and the tracking device is configured to track the rotation of the chair based on sensor data received from the rotation sensor.

Embodiment 20 is the virtual reality system of any one of embodiments 16 to 19, further comprising the virtual reality control of any one of embodiments 1 to 11, wherein the virtual reality data generation system has an input interface configured to receive the sensor data from the one or more sensors and the information about the rotation of the at least one rotary wheel switch and wherein the one or more processors are configured to render the image based on the sensor data and information about a rotation of the rotary wheel switch.

BRIEF DESCRIPTION OF THE DRAWINGS

The invention will be better understood with reference to the detailed description when considered in conjunction with the non-limiting examples and the accompanying drawings, in which.

DETAILED DESCRIPTION

The following detailed description refers to the accompanying drawings that show, by way of illustration, specific details and embodiments in which the disclosure may be practiced. These embodiments are described in sufficient detail to enable those skilled in the art to practice the disclosure. Other embodiments may be utilized and structural, and logical changes may be made without departing from the scope of the disclosure. The various embodiments are not necessarily mutually exclusive, as some embodiments can be combined with one or more other embodiments to form new embodiments.

Embodiments described in the context of one of the devices or methods are analogously valid for the other devices or methods. Similarly, embodiments described in the context of a device are analogously valid for a vehicle or a method, and vice-versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

As used herein, the term "and/or" includes any and all combinations of one or more of the associated listed items.

In the following, embodiments will be described in detail.

Figure 1:
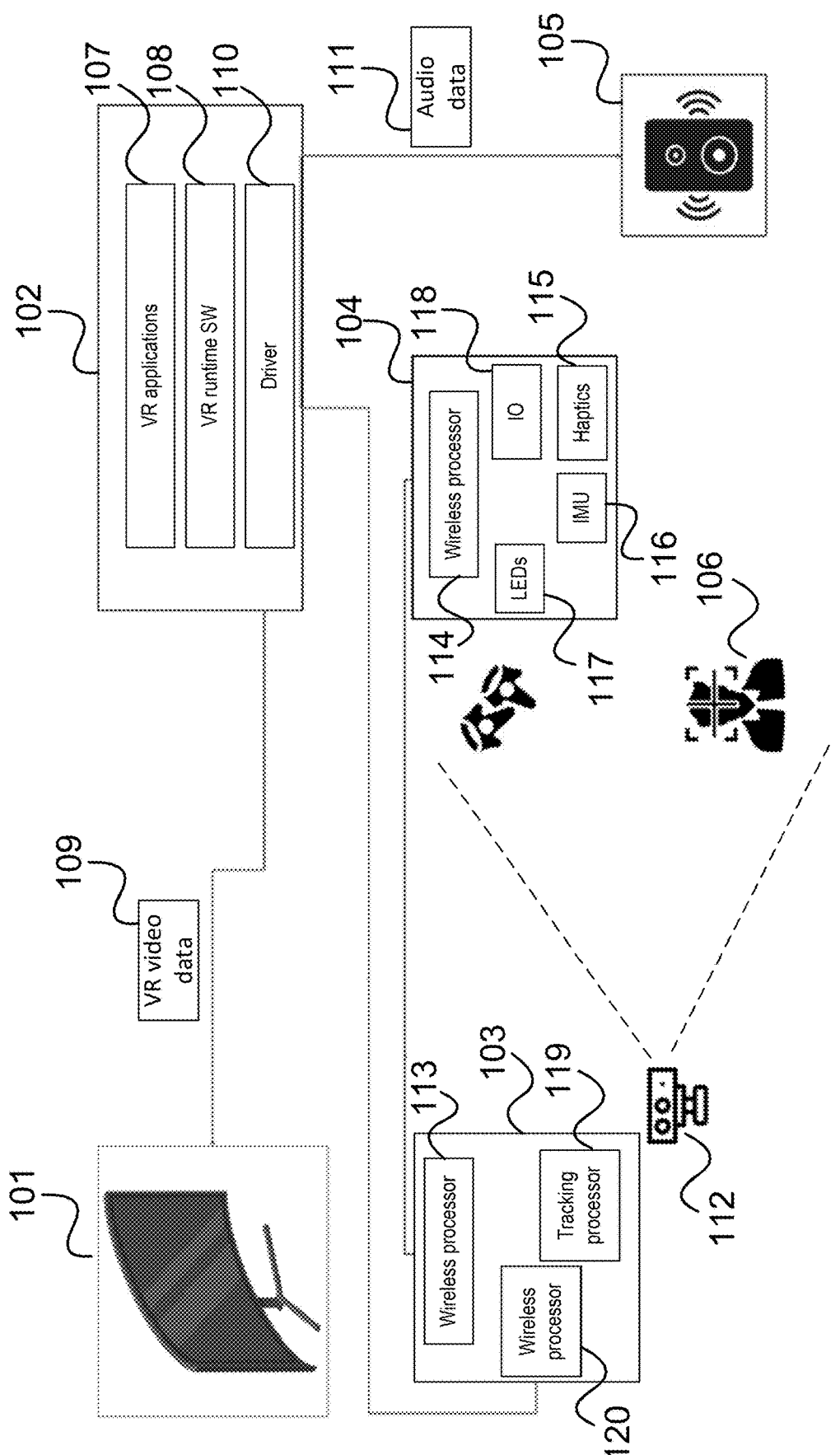
FIG. 1 shows a virtual reality system according to an embodiment.

FIG. 1 shows a virtual reality system 100 according to an embodiment.

The virtual reality system 100 includes a virtual reality (VR) display 101, a VR host 102, a tracking base station 103, at least one (typically two) handheld controller (i.e. virtual reality control device) 104, optionally one or more audio speakers 105. Depending on the head tracking technology used, the user 106 may wear a wearable device for head tracking (e.g. a headband). The tracking base station 103 is a tracking device (implementing a tracking system). Its functionality as described in the following may also at least in part be implemented by the VR host 102. The tracking base station 103 and the VR host 102 together form a VR data generation system.

The VR host 102 is a data processing device (including one or more processors, a memory etc.) for example a personal computer and runs one or more VR applications 107. A VR application 107 may use a VR runtime software (such as SteamVR) 108 to generate VR video data 109 which the VR host 102 outputs via a respective device driver of a set of device (e.g. plug-in) drivers 110 (including e.g. a display driver and audio driver and a tracking software driver) to the VR display 101 which displays the VR video data 109. Similarly, the VR host 102 may generate and output corresponding (VR) audio data 111 to the one or more audio speakers 105 which output the audio data 111 (in synchronization with the VR video data 109 to which they correspond). The VR host 102 may for example provide a VR driver API to allow the VR runtime software to interact with the drivers 110.

The VR host 102 generates the VR video data 109 depending on the pose of the user 106, including the direction in which the user 106 looks and the user's position (including in particular hand and (at least partially) finger positions). The user's pose is tracked by the tracking base station 103 which tracks the user's head pose, e.g. by a camera 112 or by another technology. The tracking base station 103 further tracks the pose of one or both of the user's hands (including at least partially finger positions, e.g. whether the hand is open or closed) by signals received from the handheld controller(s) 104. For this, the tracking base station 103 connects to the handheld controller(s) 104 by wireless connection. To support the wireless connection, each of the tracking base station 103 and the handheld controller(s) 104 has a respective wireless processor 113, 114.

Each handheld controller 104 further has for example one or more haptic elements 115 including corresponding haptic sensors (e. g. for detecting whether a finger touches a button and thus the hand is closed and for detecting button presses etc.), an IMU (inertial measurement unit) 116 to detect its movement, LEDs 117 (arranged in a certain layout, i. e. constellation) to determine the handheld controller's 104 pose in 3D space and IO components 118 which for example bring the data from the IMU 116, the one or more haptic elements 115 and the LEDs 117 into a form for communication to the tracking base station and to receive control signals from the tracking base station 103. The LEDs 117 can be seen as tracking elements which allow determining the handheld controller's pose in 3D space by an external device (here the tracking base station 103). Alternatively, inside-out tracking in the controller 104 can be used which does not require an LED constellation. The IMU 116 can be seen as a sensor configured to sense sensor data allowing determining the 3D position of the virtual reality control device in 3D space.

From the user pose sensor data obtained from the handheld controller(s) 104 (e.g. the IMU 117) and the respective head tracking technology (e.g. camera 112), a tracking processor 119 (e.g. running tracking software including e.g. a virtual head computation software) of the tracking base station 103 determines (and, over time, tracks) the user's pose and transmits, via a communication processor (e.g. a further wireless processor), user pose information to the VR host (which receives the information via a respective driver (e.g. tracking software driver) of the set of drivers 110).

Thus, the VR host 102 can generate the VR video data 109 (and possibly also the audio data 111) to fit the user's pose, e. g. display avatar hands in a pose corresponding to the pose of the user's hands and display a field of view corresponding to the user's head pose.

According to various embodiments, the virtual reality system 100 is optimized for seated gaming experience by having an external VR display 101 that is placed externally (not attached to the user, i.e. not included in a wearable device worn by the user), wireless VR controllers 104 for hand controls, head and controller tracking to allow the user 106 to control its avatar's (i.e. virtual person's) head and hands, audio to be projected to the user 106 by beam forming speakers 105 (which may be in the form of (i.e. including in) a audio headset) and providing VR content (from the VR application 107 and VR runtime software 108) to the user by means of the VR display 101 and the one or more speakers 105 including video according to the user's field of view in the virtual world (and hand poses acquired by the handheld controller(s)).

According to various embodiments, the user 106 may control his or her avatar (virtual character), in particular its avatar's field of view, by a combination of own head movements, handheld controller 104 movements and additional inputs into the controllers (like a rotary wheel switch as described in detail below, e.g. as part of the haptic elements 115). The tracking base station 103 implements a tracking system that tracks the user's head (and/or possibly gaze direction) and handheld controller movement. It should be noted that instead of tracking one or more handheld controllers, the hands of the user 106 may be directly tracked (when the user does not hold a handheld controller in one or both hands). The VR display 101 outputs the virtual world with the user's virtual character that is controlled by the user's head and/or gaze orientations, handheld controller (or hand) poses and handheld controller (e.g. rotary wheel switch) inputs.

It is also possible that the user 106 controls the virtual character by a combination of head movements, chair movements, hand and/or handheld controller movements and additional inputs in the handheld controller 104. In that case, the tracking base station 103 implements a tracking system that tracks the user's chair movement (to determine head and/or gaze direction) and hand and/or handheld controller movement and the VR display 101 outputs the virtual world with user's virtual character that is controlled by the user's head and/or gaze orientations (from the tracked chair movement), hand and/or handheld controller poses and handheld controller inputs.

According to one embodiment, the user 106 controls the virtual character by combination of own head movements, chair movements, hand and/or handheld controller movement and additional inputs in the handheld controllers 104. In that case, the tracking base station 103 implements a tracking system that tracks the user's head and/or gaze direction, chair and hand and/or handheld controller movement and the VR display 101 outputs the virtual world with user's virtual character that is controlled by the user's head and/or gaze direction, hand and/or hand controller poses and handheld controllers inputs. Furthermore, the VR display 101 may be a monitor that is mounted to the chair to allow the user 106 to turn with the chair and thus control the user's field of view without losing sight of the VR display 101.

Figure 2:
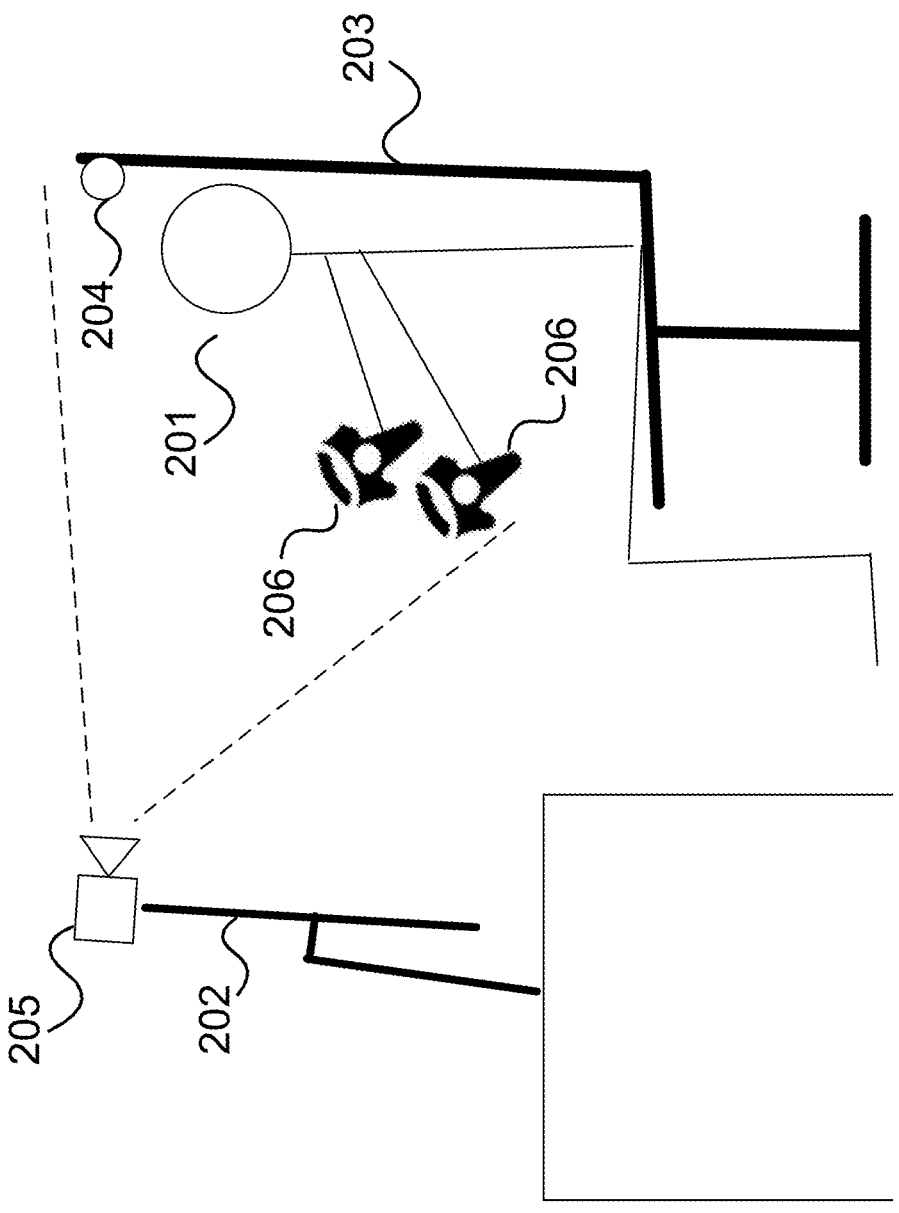
FIG. 2 illustrates a virtually reality system where a user sits in a chair whose movement (i.e. orientation) is tracked.

FIG. 2 illustrates a VR system where a user 201 (corresponding to user 106) sits in a chair 203 whose movement (i.e. orientation) is tracked, e.g. by means of a tracking element 204 emitting infrared light captured by a camera 205 (corresponding to camera 112). As explained above, the orientation information from the chair may be used (in combination with other head and/or gaze tracking information but also alone) to determine the user's head and/or gaze orientation according to which a VR display 202 (corresponding to VR display 101) outputs video content. In the example of FIG. 2, the user 201 further has handheld controllers 206 by which the user may control its user's avatar (in particular change the avatar's pose and field of view without moving himself).

Head tracking may be done by optical (e.g. infrared) head tracking, e.g. by attaching tracking elements (which emit infrared light which may be tracked by the camera 112) to an audio headset, glasses or a headband. The glasses may for example be shutter glasses (synchronized with the VR display 101) to allow the user 106 to have a real 3D view (rather than a 2D projection of a 3D world). In case of no real 3D (but 2D projection), the VR display 101 may be curved to improve the 3D impression for the user.

As mentioned above the handheld controller(s) 104 may have a rotary wheel switch. According to various embodiments, a handheld controller is used (and e.g. used as one or two handheld controllers 104 of the VR system 100) which has multiple rotary wheel switches (and possibly also a tracking ball) as described in the following with reference to FIGS. 3 and 4. The multiple rotary wheel switches allow controlling different body parts of the user's avatar.

Figure 3:
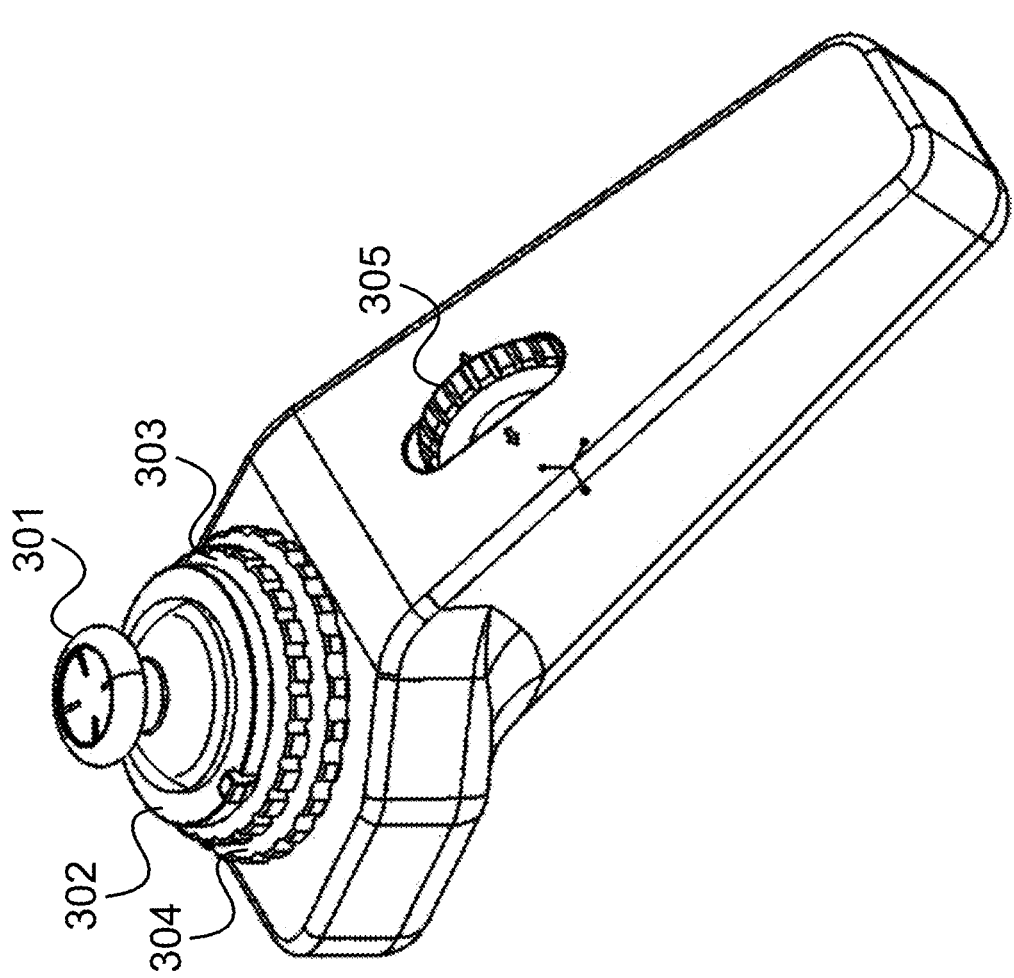
FIG. 3 shows a virtual reality control device (i. e. hand-held controller) according to an embodiment.

FIG. 3 shows a virtual reality control device (i. e. handheld controller) 300 according to an embodiment.

The handheld controller 300 has a joystick 301 to simulate pitch and roll movement of the user's avatar's head. It returns to a neutral (i.e. default) position when released.

The handheld controller 300 further has a first layer horizontal rotary wheel switch (or simply "rotary switch", i.e. a control element in the form of a scroll wheel (but not necessarily used for scrolling)) 302, e.g. to simulate avatar head (specifically neck) movement (yaw). The handheld controller 300 for example includes a mechanical encoder for the first layer horizontal rotary wheel switch 302. The first layer horizontal rotary wheel switch 302 is for example spring loaded to return to a neutral position of the control body parts when released. It may be limited in rotating angle (<360 degree—predetermined limit).

The handheld controller 300 further has a second layer horizontal rotary wheel switch 303, e.g. to simulate avatar waist (i.e. torso) movement (yaw). The handheld controller 300 for example includes a mechanical encoder without detent for the second layer horizontal rotary wheel switch 303. The second layer horizontal rotary wheel switch 303 is for example spring loaded to return to a neutral position when released. It may be limited in rotating angle (<360 degree—predetermined limit).

The handheld controller 300 further has a third layer horizontal rotary wheel switch 304, e.g. to simulate avatar feet (or leg) movement (yaw). The handheld controller 300 for example includes a mechanical encoder without detent for the third layer horizontal rotary wheel switch 304. The third layer horizontal rotary wheel switch 304 has for example an unlimited rotating angle (>=360 degree).

The handheld controller 300 further includes a vertical rotary wheel switch (e.g. a vertical rotary wheel switch) 305 which may (in addition to the scroll functionality) implement a left button (operated by pressing the vertical rotary wheel switch 305 to the left (in top view)), a right button (operated by pressing the vertical rotary wheel switch 305 to the right (in top view)) and a middle button (operated by pressing the vertical rotary wheel switch 305 downwards (in top view)).

The user 106 may for example use the vertical rotary wheel switch 305 to cause movement of the avatar head in z-axis by scrolling the vertical rotary wheel switch 305 up and down, pitch of the avatar head by pressing left or right (i.e. by operating the left button and the right button)

return to neutral pitch position by pressing downwards (i.e. by operating the middle button)

The handheld controller 300 for example includes a mechanical encoder without detent for the vertical rotary wheel switch 305. The vertical horizontal rotary wheel switch 305 may be limited in rotating angle (<360 degree-predetermined limit).

Figure 4:
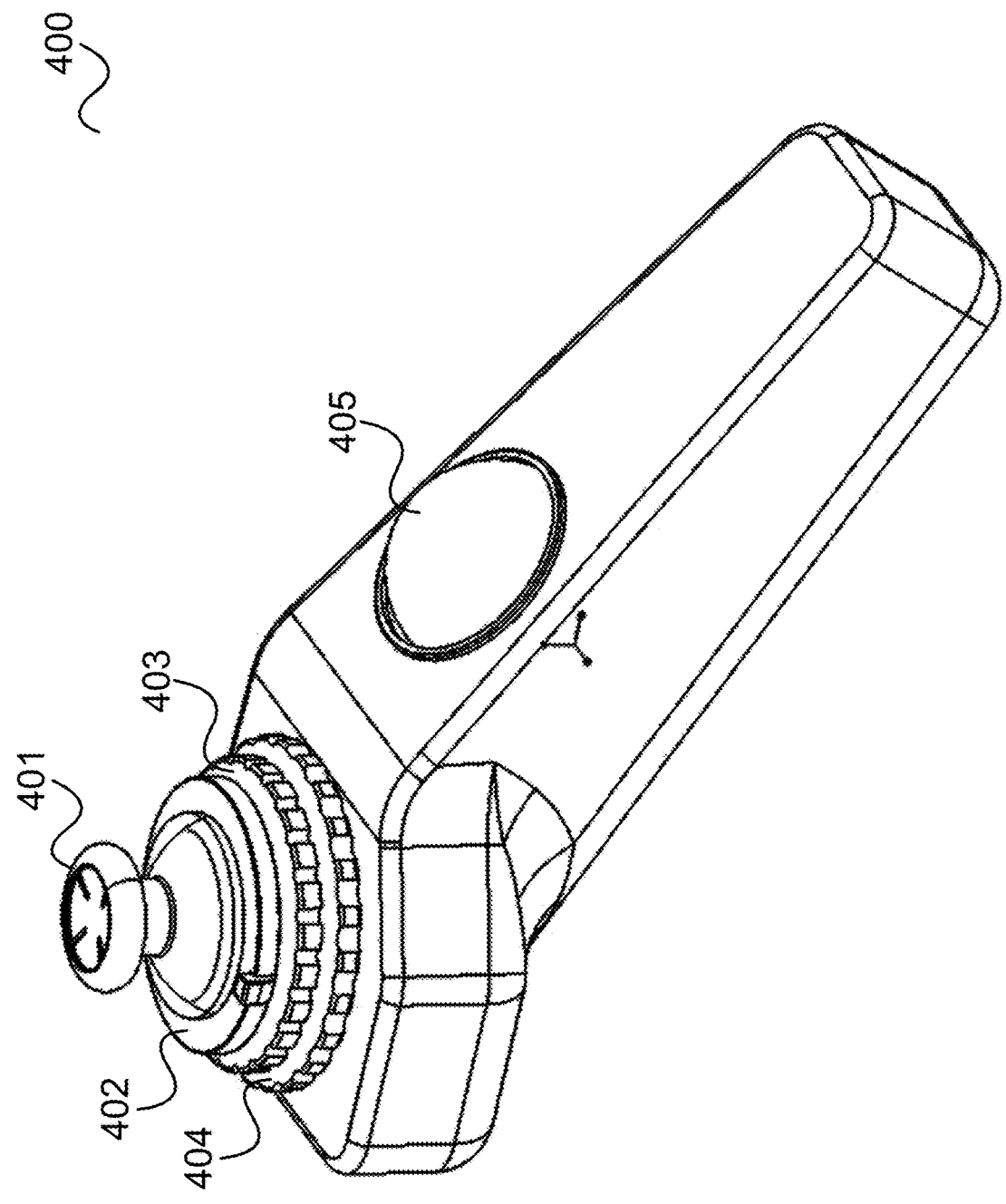
FIG. 4 shows a virtual reality control device (i. e. hand-held controller) according to another embodiment.

FIG. 4 shows a virtual reality control device (i. e. handheld controller) 400 according to another embodiment.

Similar to the handheld controller 300 of FIG. 3, the handheld controller 400 includes a joystick 401 and three horizontal rotary wheel switches 402, 403, 404. In contrast to the handheld controller 300 of FIG. 3, the handheld controller 400 includes a semi-sphere tracking ball 405 instead of the vertical rotary wheel switch 305.

The semi-sphere tracking ball 405 may implement a middle button (operated by pressing the semi-sphere tracking ball 405 downwards (in top view)). It can be assigned to control two degree of movements.

The user 106 may for example use the semi-sphere tracking ball 405 to cause movement of the avatar head by moving the tracking ball 405 up and down, pitch of the avatar head by moving the tracking ball 405 left and right, return to neutral pitch position by pressing downwards (i.e. by operating the middle button).

While in the examples of FIG. 3 and FIG. 4 the rotary wheel switches are arranged in a form of respective rings surrounding the base of the analogue stick 301, 401, a rotary wheel switch may also be arranged at a position on the controller that is easily accessible and operate by the user's thumb. Each rotary wheel switch can be assigned to control rotational trajectory of the Avatar's head by movement of specific body parts (e. g. yaw rotation of the head by neck movement or yaw rotation of head by lower limb).

By using the control elements 301-305 and 401-405 the user 106 can control the user's avatar by handheld controller(s) 300, 400 in particular to trigger intended body postures changes that in turn change the head position and the user's gaze direction without actually performing body postures changes (in real life) and thus remain in seated position facing the display 101. In other words, the user 106 may simulate body (part) movement without carrying out the movement in real life.

A joystick 301, 401 may be used to control the avatar's x and y direction movement. For example, the user has two handheld controllers, each having a respective joystick and the joystick of one controller is assigned to pitch and roll movement of the avatar's head while the joystick of the other controller is assigned to x and y direction body movements (i.e. movement of the whole avatar on the ground plane).

The tracking system (implemented in the example of FIG. 1 by the tracking base station but which also at least partially be implemented by the VR host 102) itself may acquire user head, handheld controller, and chair positions or poses (e.g. in terms of one or more of x, y, z, yaw, pitch, and roll), e.g.

at least partially by means of the camera 112 (and a corresponding camera tracking system or module) and combine these (e.g. with a virtual head and/or hand pose computation model) with input from input from the handheld controller(s) 104 (analogue stick position, rotary wheel switch positions, button presses) to a virtual head pose (e.g. x, y, z, yaw, pitch, roll) and possibly also hand poses. The VR runtime software (or engine) 108 generates the video data 109 accordingly.

As mentioned above, the user 106 may use the second layer and third layer rotary wheel switches 303, 304, 403, 404, to control lower (i.e. below head) body movements. These may have impact on the virtual head and virtual hand poses.

For example, using the user 106 may use the third layer rotary wheel switches 304, 404 to change the direction into which the avatar's feet (and knees) face. The tracking base station 103 may determine the change of the virtual head pose and the virtual hand pose that are caused by this change in direction accordingly (i.e. to follow the body change pose caused by this change in direction). It for example shifts both the virtual head and virtual hand positions together. In contrast, when the user only performs input to change the head position (e.g. using the first layer rotary wheel switches 302, 402), the tracking base station 103 (and/or VR host 102) only changes the virtual head position, i.e. the virtual hand positions stay the same.

Alternatively, the VR system 100 may be configured such that the user 106 controls head rotation with the analogue joystick 301, 401. For example, moving the joystick 301, 401 to maximum radius at a certain angle may simulate the movements of the user's head and gaze by changing the body pose including feet and knee movements. The tracking base station then shifts both the virtual head and virtual hand positions together. Releasing the joystick 300, 400 does not return the avatar to the starting angular position.

Alternatively, moving the joystick 300, 400 to smaller than max radius at a certain angle, simulates the movements of the user's head and gaze by changing the head (specifically neck) orientation.

In that case, the tracking base station 103 (and/or VR host 102) only changes the virtual head position, i.e. the virtual hand positions stay the same and in that case, releasing the joystick 300, 400 may return the avatar head to the starting angular position.

Vertical body movement (simulated by operating the vertical rotary wheel switch 305 or the track ball 405 as described above) leads to vertical movements of user's virtual head and gaze direction.

As explained above with reference to FIG. 1, the virtual reality control devices 300, 400 include one or more sensors (e.g. an IMU) configured to sense sensor data allowing determining the 3D position of the virtual reality control device in 3D space and may also include one or more tracking elements (e.g. LEDs) which allow determining the handheld controller's pose in 3D space by an external device (like the tracking base station 103).

In summary, according to a first embodiment, a virtual reality control device is provided including one or more sensors (e. g. an IMU) configured to sense sensor data allowing determining the 3D position of the virtual reality control device in 3D space, at least one rotary wheel switch and an output interface configured to output the sensor data from the one or more sensors and information about a rotation of the at least one rotary wheel switch.

According to a second embodiment, a virtual reality system is provided including a chair (e. g. a swivel chair and/or a chair on rolls), a tracking device configured track a rotation of the chair and a virtual reality data generation system having one or more processors configured to render an image depending information about a rotation of the chair.

The first embodiment and the second embodiment (including any examples and embodiments thereof) may be combined with each other.

To determine the information about rotation of the at least one rotary wheel switch (or other elements like a track ball) the virtual reality control device may have corresponding rotation sensors, e.g. a mechanical encoder.

According to one embodiment, a user may control a virtual character by combination of own head movements, hand/controller movements and additional inputs in other input devices such as keyboards. A tracking system tracks user's head/gaze and hand/controller movement and a VR display outputs the virtual world with user's virtual character that is controlled by the user's head/gaze orientations, hand/controller positions and controllers inputs.

According to one embodiment, a user control may a virtual character by combination of own head movements, chair movements, hand/controllers movements and additional inputs in input devices. A tracking system tracks user's head/gaze, chair and hand/controller movement and a VR display output the virtual world with the user's virtual character that is controlled by the user's head/gaze orientations, hand/controller positions and controllers inputs.

According to one embodiment, a user may control a virtual character by combination of chair movements, hand/controller movements and additional inputs in other input devices. A tracking system tracks user's chair (to predict head/gaze) movement and hand/controller movement and a VR display output the virtual world with the user's virtual character that is controlled the user's his head/gaze orientations, hand/controller positions and controllers inputs.

According to one embodiment, a user may control a virtual character by combination of own head movements, chair movements, hand/controllers movements and additional inputs in other input devices. A tracking system tracks user's head/gaze, chair and hand/controller movement and a VR display (mounted on the chair) outputs the virtual world with the user's virtual character that is controlled by his head/gaze orientations, hand/controller positions and controller inputs.

According to one embodiment, a virtual reality (VR) system for gaming experience of a user seating on a chair is provided that includes a VR display placed externally, not attached to any wearable device;

a VR controller with a plurality of inputs for hand controls; and a tracking system to track the position of the VR controller and the user's head and gaze, wherein the VR display outputs a virtual world with the user's virtual character that is controlled by the user's head/gaze orientations, hand/controller positions and controller inputs.

According to one embodiment, the user can control the virtual character displayed on the VR display by combination of the user's head movements, hand/controller movements and the controller inputs.

According to one embodiment, the tracking system further tracks the chair movements so that the user can control the virtual character displayed on the VR display, by combination of the user's head movements, chair movements, hand/controller movements and the controller inputs.

According to one embodiment, the virtual character can be controlled by the VR controller, allowing the user to simulate intended body posture changes that in turn change the head position and gaze without actually performing body posture changes and remain in seated position facing the VR display.

According to one embodiment, the VR controller controls the virtual character's movements of head rotation, body rotation by feet and body vertical movements.

According to one embodiment, the VR display is mounted to the chair.

It should be noted that as described above, VR system and VR display etc. is not necessarily understood that it produces a "real" 3D view (i.e. different images for the user's eyes to give a depth impression). It is also possible that a 2D projection of a 3D world is displayed. Nevertheless, a VR aspect is achieved since the point of view is determined in accordance with physical body movement and/or avatar hands follow virtual reality control device movement in real 3D space. However, according to various embodiments, the VR display generates different images for the user's eyes and the VR system uses a VR technique like a stereoscopic display or shutter glasses to give a depth impression to the user.

The processing described herein may be performed and the various processing or computation units and the devices and computing entities described herein may be implemented by one or more circuits. In an embodiment, a "circuit" may be understood as any kind of a logic implementing entity, which may be hardware, software, firmware, or any combination thereof. Thus, in an embodiment, a "circuit" may be a hard-wired logic circuit or a programmable logic circuit such as a programmable processor, e. g. a microprocessor. A "circuit" may also be software being implemented or executed by a processor, e. g. any kind of computer program, e. g. a computer program using a virtual machine code. Any other kind of implementation of the respective functions which are described herein may also be understood as a "circuit" in accordance with an alternative embodiment.

While the disclosure has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A virtual reality control system comprising:

a virtual reality control device comprising one or more sensors configured to sense sensor data allowing determining a 3D position of the virtual reality control device in 3D space;

one-multiple rotary wheel switches; and an output interface configured to output the sensor data from the one or more sensors and information about a rotation of the each of the multiple rotary wheel switches; and a virtual reality data generation system comprising an input interface configured to receive the sensor data from the one or more sensors and the information about the rotation of the multiple rotary wheel switches; and one or more processors configured to render an image depending on the sensor data and information about a rotation of the multiple rotary wheel switches, wherein the image is a view from a point of view of a user avatar, wherein the virtual reality data generation system is configured to determine, for each of the rotary wheel switches, a rotation of a respective body part of the user avatar associated with the rotary wheel switch according to information about a rotation of the rotary wheel switch and to render the image in accordance with the determined rotations of the body parts.

2. The virtual reality control system of claim 1, wherein the virtual reality control device comprises one or more tracking elements which allow determining the handheld controller's pose in 3D space by an external device.

3. The virtual reality control system of claim 1, wherein the virtual reality control device comprisesing an analogue stick wherein the at least one rotary wheel switch is in a form of a ring surrounding a base of the analogue stick.

4. The virtual reality control system of claim 1, wherein the multiple rotary wheel switches include two or more rotary wheel switches in a form of rings stacked on top of each other.

5. The virtual reality control system of claim 1, wherein the multiple rotary wheel switches include two or more rotary wheel switches whose rotation axes are inclined with respect to each other.

6. The virtual reality control system of claim 1, wherein the multiple rotary wheel switches include two or more rotary wheel switches whose rotation axes are at least substantially perpendicular to each other.

7. The virtual reality control system of claim 1, wherein at least one of the rotary wheel switches is configured to return to a default position when released.

8. The virtual reality control system of claim 1, wherein the virtual reality control device further comprises a track ball wherein the output interface is configured to output information about a rotation of the at least one track ball.

9. The virtual reality control system of claim 1, wherein the output interface is a wireless output interface.

10. The virtual reality control system of claim 1, wherein the output interface is configured to connect to the virtual reality data generation system and output the sensor data from the one or more sensors and the information about the rotation of the multiple rotary wheel switches to the virtual reality data generation system.

11. The virtual reality system of claim 1, wherein the body parts include two or more legs of an avatar, a torso of the avatar and a head of the avatar.

12. The virtual reality system of claim 1, further comprising:

a chair; and a tracking device configured track a rotation of the chair, wherein the virtual reality data generation system is configured to render the image depending information about a rotation of the chair.

13. The virtual reality system of claim 12, comprising a screen fixed to the chair configured to display the rendered image.

14. The virtual reality system of claim 12, wherein the chair comprises a tracking element and the tracking device is configured to track the rotation of the chair by means of optical tracking of the tracking element.

15. The virtual reality system of claim 12, wherein the chair comprises a rotation sensor connected to the tracking device and the tracking device is configured to track the rotation of the chair based on sensor data received from the rotation sensor.

\* \* \* \* \*